US008089456B2

(12) United States Patent
Grego et al.

(10) Patent No.: US 8,089,456 B2
(45) Date of Patent: Jan. 3, 2012

(54) INPUTTING INFORMATION USING HOLOGRAPHIC TECHNIQUES

(75) Inventors: Giorgio Grego, Turin (IT); Diego Roccato, Turin (IT)

(73) Assignee: Telecom Italia S.p.A., Milan (IT)

( * ) Notice: Subject to any disclaimer, the term of this patent is extended or adjusted under 35 U.S.C. 154(b) by 1062 days.

(21) Appl. No.: 11/631,078

(22) PCT Filed: Jun. 30, 2004

(86) PCT No.: PCT/EP2004/007105
§ 371 (c)(1),
(2), (4) Date: Dec. 28, 2006

(87) PCT Pub. No.: WO2006/002666
PCT Pub. Date: Jan. 12, 2006

(65) Prior Publication Data
US 2009/0184851 A1     Jul. 23, 2009

(51) Int. Cl.
*G09G 5/00* (2006.01)
(52) U.S. Cl. ........... 345/156; 345/168; 345/170; 359/22
(58) Field of Classification Search .......... 345/156–173; 359/22
See application file for complete search history.

(56) References Cited

U.S. PATENT DOCUMENTS

| | | | |
|---|---|---|---|
| 3,658,402 A | 4/1972 | Nishida et al. | |
| 5,424,866 A * | 6/1995 | Kikinis | 359/292 |
| 5,479,257 A | 12/1995 | Hashimoto | |
| 6,031,519 A * | 2/2000 | O'Brien | 345/156 |
| 6,377,238 B1 * | 4/2002 | McPheters | 345/156 |
| 6,650,318 B1 * | 11/2003 | Arnon | 345/168 |
| 2002/0054402 A1 * | 5/2002 | Klug et al. | 359/23 |
| 2002/0070921 A1 | 6/2002 | Feldman | |
| 2003/0193479 A1 * | 10/2003 | DuFaux | 345/168 |
| 2004/0021871 A1 * | 2/2004 | Psaltis et al. | 356/451 |
| 2004/0042375 A1 * | 3/2004 | Edwards | 369/103 |
| 2004/0095315 A1 * | 5/2004 | Montellese | 345/156 |

FOREIGN PATENT DOCUMENTS

WO     WO 96/29677     9/1996

OTHER PUBLICATIONS

Hariharan, P., "Chapter 13—Information Storage and Processing," Optical Holography, pp. 194-205, (1984).

* cited by examiner

*Primary Examiner* — Alexander Eisen
*Assistant Examiner* — Viet Pham
(74) *Attorney, Agent, or Firm* — Finnegan, Henderson, Farabow, Garrett & Dunner, L.L.P.

(57) ABSTRACT

A method for inputting commands to a holographic input system, includes the steps of generating a virtual image of an input device by illuminating a hologram of the input device by means of a corresponding reference beam, the hologram being prerecorded on a holographic support; optically detecting a position of at least one actuator for operating the input device with respect to the virtual image of the input device; and issuing at least one command signal corresponding to the position of that at least one actuator as optically detected. The optical detection operation further includes providing at least one actuation hologram corresponding to the at least one actuator being placed at a specified position with respect to the virtual image of the input device, illuminating the at least one actuator with a beam, in order to obtain scattering into a corresponding object beam interacting with one actuation hologram through the corresponding object beam; generating a respective actuation detection beam through the interaction; and detecting the respective actuation detection beam to issue the command signal.

25 Claims, 5 Drawing Sheets

Fig. 3

Fig_4

Fig_5

US 8,089,456 B2

INPUTTING INFORMATION USING HOLOGRAPHIC TECHNIQUES

CROSS REFERENCE TO RELATED APPLICATION

This application is a national phase application based on PCT/EP2004/007105, filed Jun. 30, 2004, the content of which is incorporated herein by reference.

FIELD OF THE INVENTION

The present invention relates to techniques for inputting data and commands through a holographic interface, such as e.g. a keyboard for a computer.

DESCRIPTION OF THE RELATED ART

The growing diffusion of computer systems of small size, e.g. palm computer, has led to the development of input systems based on the interaction of a user actuator, e.g. a finger, with an image of a physical input device, in order to obtain an input device having a very small or null tangible size, that is thus easily portable.

Systems are known that exploit interaction of the user's fingers with images of input devices projected onto a plane. The interaction with the input device takes place when the actuating finger is detected in a specific position with respect to the image. Detection can be obtained through different methods, such as detection of position using a camera. This kind of devices, however, requires a plane or a surface for projecting the image.

Holographic input devices are also known not requiring a surface for image projection. For instance, U.S. Pat. No. 6,377,238 discloses a method for controlling an input device by an operator; the method is provided through a holographic image of the keys or other input devices customarily actuated, to provide input data to the system. The actuation of the holographic image of the input devices is detected optically, by means of photoemitters and photoreceptors, without tangible physical contact by the operator with a solid control object or control surface of the system.

From U.S.-A-2002/0070921 a holographic keyboard is known comprising a portable unit that further comprises a hologram producing means, sensory reception means, and signal processing means. The hologram producing means create an image of a keyboard with all of its keys mapped out. The sensory reception means is an array of sensory elements, preferably, photodiodes capable of receiving and detecting changes in a light pattern, which are arranged so that each sensory element corresponds to a projected key on the holographic image of the keyboard.

From U.S. Pat. No. 5,479,257 an object position detecting method and apparatus are known. The object position detecting apparatus comprises an image input device, a Fourier transform device for performing Fourier transform on an input object image, a reference beam device for generating a reference beam, a recording device for recording a wavefront formed by interference between the Fourier transform information on the input object image and the reference beam, thereby producing a Fourier transform hologram, a read device for reading the recorded Fourier transform hologram by using the Fourier transform information on the input object image, an inverse Fourier transform device for subjecting the read information to inverse Fourier transform, and a detecting device for detecting the information having been subjected to the inverse Fourier transform, thereby obtaining the position of the object to be recognized.

OBJECT AND SUMMARY OF THE INVENTION

Applicants have identified the need for an arrangement that allows a holographic representation of an input device and a simple and direct interaction with such a holographic representation.

According to the present invention, that object is achieved by means of a method for inputting commands, comprising the operations of:

generating a virtual image of an input device by illuminating a hologram of said input device by means of a corresponding reference beam, said hologram being prerecorded on a holographic support;

optically detecting a position of a least one actuator for operating said input device with respect to said virtual image of said input device; and issuing at least one command signal corresponding to said position of said at least one actuator as optically detected, characterized in that said optical detection operation includes:

providing at least one actuation hologram corresponding to said at least one actuator being placed at a specified position with respect to said virtual image of said input device;

illuminating said at last one actuator with a beam in order to obtain scattering into a corresponding object beam;

interacting with one actuation hologram through the corresponding object beam;

generating a respective actuation detection beam through said interaction; and detecting said respective actuation detection beam to issue said command signal.

The objects of the present invention are also achieved by a corresponding system for inputting commands, comprising an optical system for generating a virtual image of an input device by illuminating a hologram of said input device by means of a reference beam, said hologram being prerecorded on a holographic support;

a detection module for optical detection of the position of at least one actuator for operating said input device with respect to said virtual image of said input device; and an issuing module for issuing at least one command signal corresponding to said position of said at least one actuator as optically detected, characterized in that it includes:

prerecorded actuation holograms corresponding to said at least one actuator being placed at specified positions with respect to said virtual image of said input device; and a further optical system for illuminating said at least one actuator in order to obtain scattering into a corresponding object beam, wherein the actuation hologram is capable of interacting with the corresponding object beam in order to generate a respective actuation detection beam, and wherein the detection module is capable of detecting said respective actuation detection beam to issue said command signal.

It is also an object of the present invention to provide a holographic support of the system described above and a method for producing the holographic support comprising the operations of:

recording a hologram of said input device on said holographic support by means of an object beam and a first reference beam; and recording on said holographic support by means of at least one respective reference beam at least one actuator hologram of at least one actuator being placed at one of a plurality of specified positions with respect to a virtual image of said hologram of said input device.

In brief, the arrangement described herein is based on a method for inputting commands in a holographic input device or apparatus, that provides for recording separately on a holographic support a hologram of the input device and one or more holograms of an actuator suitable for operating the input device.

During operation, the hologram of the input device is shown to the user. If a real actuator, i.e. a user's finger, is placed in a position on the holographic image of the input device corresponding to a position in which a hologram of an actuator was previously recorded, the corresponding reference beam previously used for recording is generated through the holographic support. Such a corresponding reference beam is detected and identified by suitable detection means and the corresponding command issued.

BRIEF DESCRIPTION OF THE ANNEXED DRAWINGS

The invention will now be described, by way of example only, by referring to the enclosed figures of drawing, wherein.

DETAILED DESCRIPTION OF PREFERRED EMBODIMENTS OF THE INVENTION

In the following some basic notions of holography will be recalled in order to favor a better understanding of the invention.

Holography is a photographic process through which a film or films are impressed by means of coherent light, such as a laser radiation, in order to produce three-dimensional images. The pattern recorded on the film thus produced is called hologram.

Figure 1:
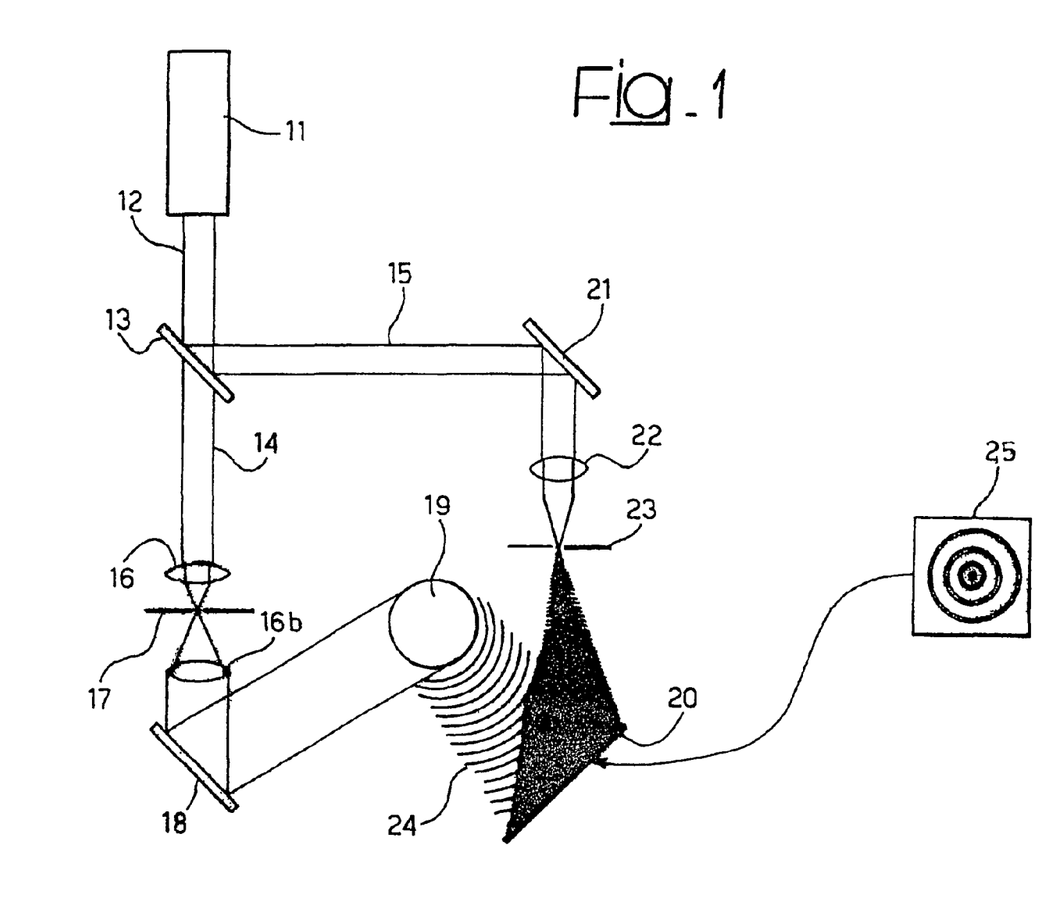
FIG. 1 is a schematic representation of a typical arrangement for recording an hologram described herein.

In FIG. 1 a system (holographic recording arrangement) for obtaining an hologram is shown where a laser source 11 generates a laser beam 12 that impinges on a beam splitter mirror 13. Such a beam splitter mirror 13 generates an object beam 14 and a reference beam 15, that are coherent (i.e. they have a determined phase relationship).

The object beam 14 is focused by a lens 16 through a spatial filter 17 and then reflected, after the beam has been parallelized by a further lens 16b, by a first reflecting mirror 18 on a object 19. Such an object 19 reflects the object beam originating secondary waves of coherent light, that form a diffused beam 24, impinging on the film or photographic plate 20.

At the same time, a reflecting mirror 21 reflects the reference beam 15, through a lens 22 and a pinhole 23 onto the photographic plate 20.

The arrangement described above allows for obtaining superimposition of the wave planes of the object beam 14 and reference beam 15 in correspondence of the surface of the photographic plate 20. Since such beams 14 and 15 are coherent, they originate an interference pattern, or hologram 25, on the plate 20. The features of the interference pattern or hologram 25 depend on the shape of the object 19, its position with respect to the plate 20 and with respect to the other optical elements forming the holographic recording arrangement.

Figure 2:
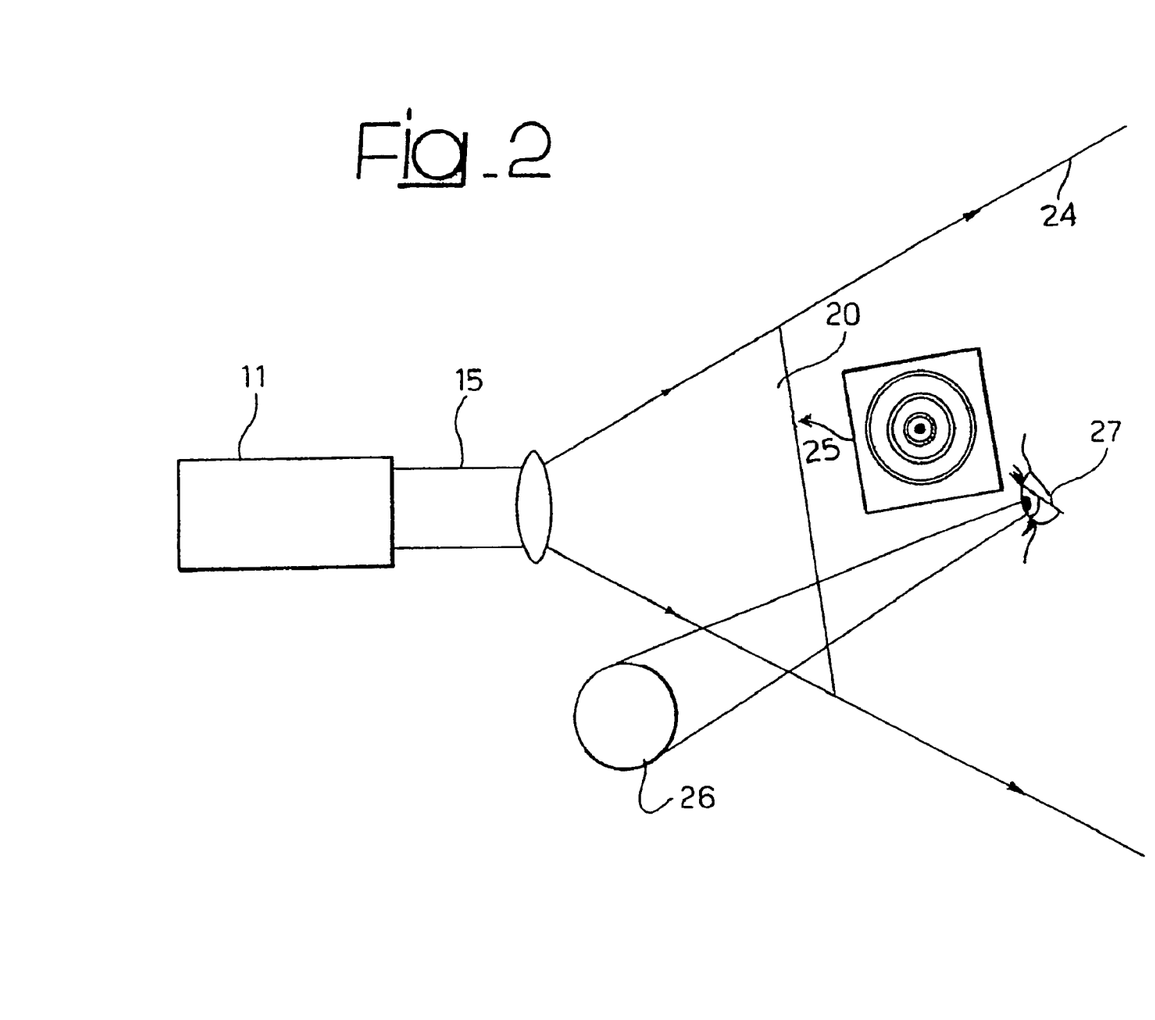
FIG. 2 represents the arrangement of FIG. 1 in a second operation configuration suitable for reproducing a virtual image.

As shown in FIG. 2, it is then possible to illuminate at a later stage the plate 20 with a beam corresponding to the reference beam 15, previously used for creating the interference pattern 25. The interference pattern 25 (FIG. 1 and FIG. 2), illuminated by the reference beam 15, generates by diffraction the diffused beam 24 so that, if a user, indicated with reference 27 in FIG. 2, looks through the plate 20, the object 19 appears as a virtual three-dimensional image 26.

Holographic techniques allows for recording several holograms on a same plate or support. The size of the interference pattern corresponds to the size of the reference beam.

The proposed arrangement provides for the holographic recording on a plate of the image of an input devices such as a keyboard. The image of the keyboard can be thus visualized by projecting the reference beam on the plate on which the corresponding interference pattern has been recorded.

The proposed arrangement then aims to exploit the fact that if an object is placed in the same position in the arrangement used for recording its hologram on a plate, and the object is illuminated by the object beam, the original reference beam will be recreated through the plate.

Thus, the proposed arrangement further provides for recording holograms of actuators operating the input device. Operation of the holographic input device is obtained by illuminating the plate carrying the holograms with the reference beam, so that the virtual image of the input device appears to a user looking through the corresponding pattern on the plate. The area including the virtual image of the input device is further illuminated with the object beam. If a real actuator is placed on the virtual image in a position where the hologram of an actuator has been previously recorded, a corresponding reference beam, that can be detected and identified through optical detection means, is originated through the plate.

Now, the proposed arrangement will be detailed,

Preliminarily, some physical considerations will be supplied that relate to the way the reference beam detected for sensing the user interaction is recreated.

A reference electric field $E_i$, originated by the reference beam 15, that was shown in FIG. 1 illuminating the hologram 25, can be expressed as:

$$E_i = A_i e^{i\Psi_i} \tag{1}$$

where $A_i$ indicates the amplitude and $\Psi_i$ the phase of such a reference field $E_i$.

An object field $E_o$, diffused by the object 19, can be similarly expressed as:

$$E_o = A_o e^{i\Psi_o} \tag{2}$$

A plate field E, given by the interference of the reference field $E_i$ and the object field $E_o$ on the plate 20, is therefore:

$$E = e^{i\Psi_i}[A_i + A_o e^{i(\Psi_o - \Psi_i)}] \tag{3}$$

In the case that a transmission hologram is considered, the transmissivity $t_\alpha$ of the hologram 25 is:

$$t_\alpha = t_0 + \alpha[A_i^2 + A_o^2 + A_i A_o e^{i(\Psi_o - \Psi_i)} + A_i A_o e^{-i(\Psi_o - \Psi_i)}] \tag{4}$$

where $t_0$ indicates a transmissivity of the plate 20 and $\alpha$ indicates an absorption coefficient of the plate 20.

When, according to the proposed method, the hologram 25 is illuminated with the light diffused by the object 19, i.e. the diffused beam 24, in order to recreate the reference beam 15, a diffused field $E_2$ is $$E_2 = A_2 e^{i\Psi_2} \tag{5}$$

The hologram field $E_t$ transmitted by the hologram 25 is:

$$E_t = t_\alpha E_2 \quad (6)$$

Thus, by substituting equation (4) in equation (6) and considering $A_o \ll A_i$, the hologram field $E_t$ results:

$$E_t = (t_0 + \alpha A_i^2) A_2 e^{i\Psi_2} + \alpha A_i A_o A_2 e^{i(\Psi_o - \Psi_i + \Psi_2)} + \alpha A_i A_o A_2 e^{i(\Psi_i - \Psi_o + \Psi_2)} \quad (7)$$

For simplicity, in equation (7) the reference beam has been regarded as a plane wave, obliquely incident on the area where the hologram 25 is recorded at a different angle with respect to the diffused beam 24.

It is thus apparent that equation (7) contains three factors. The first factor of equation (7) corresponds to the diffused field $E_2$ (apart for the intensity), whereas the two remaining factors of equation (7) can be spatially separated operating along different directions, corresponding to; the different angles indicated by their phases.

In the case that the diffused field $E_2$ is equal to the object field $E_0$, i.e. if the object used to recreate the hologram is identical to the object used for recording, the second factor of equation (7), indicated with $E_c$, is:

$$E_c = \alpha A_o^2 A_i e^{-i\Psi_i} \quad (8)$$

whereas the third factor, indicated with $E_3$, is:

$$E_3 = \alpha \Box A_o^2 A_i e^{i\Psi_i} \quad (b\ 9)$$

$E_3$ represents thus a field of the reference beam that is generated through the plate, not taking in account the diffractive broadening due to the dependence of the amplitude $A_0$ from the position. The second factor $E_c$ represents the field associated to a conjugate beam of the reference beam, that is generated as well through the plate. As mentioned before, either the reference beam or its conjugate can be used for carrying out the proposed method.

If the diffused field $E_2$ is similar, although not equal, to the object field $E_0$, e.g., because a finger of a user (different from an object used for recording, such as a cylinder) is placed in a position corresponding to a depressed key, a good approximation of the corresponding reference beam (or conjugate beam) can nevertheless be obtained, which will in general be sufficient to identify the depressed key.

Figure 3:
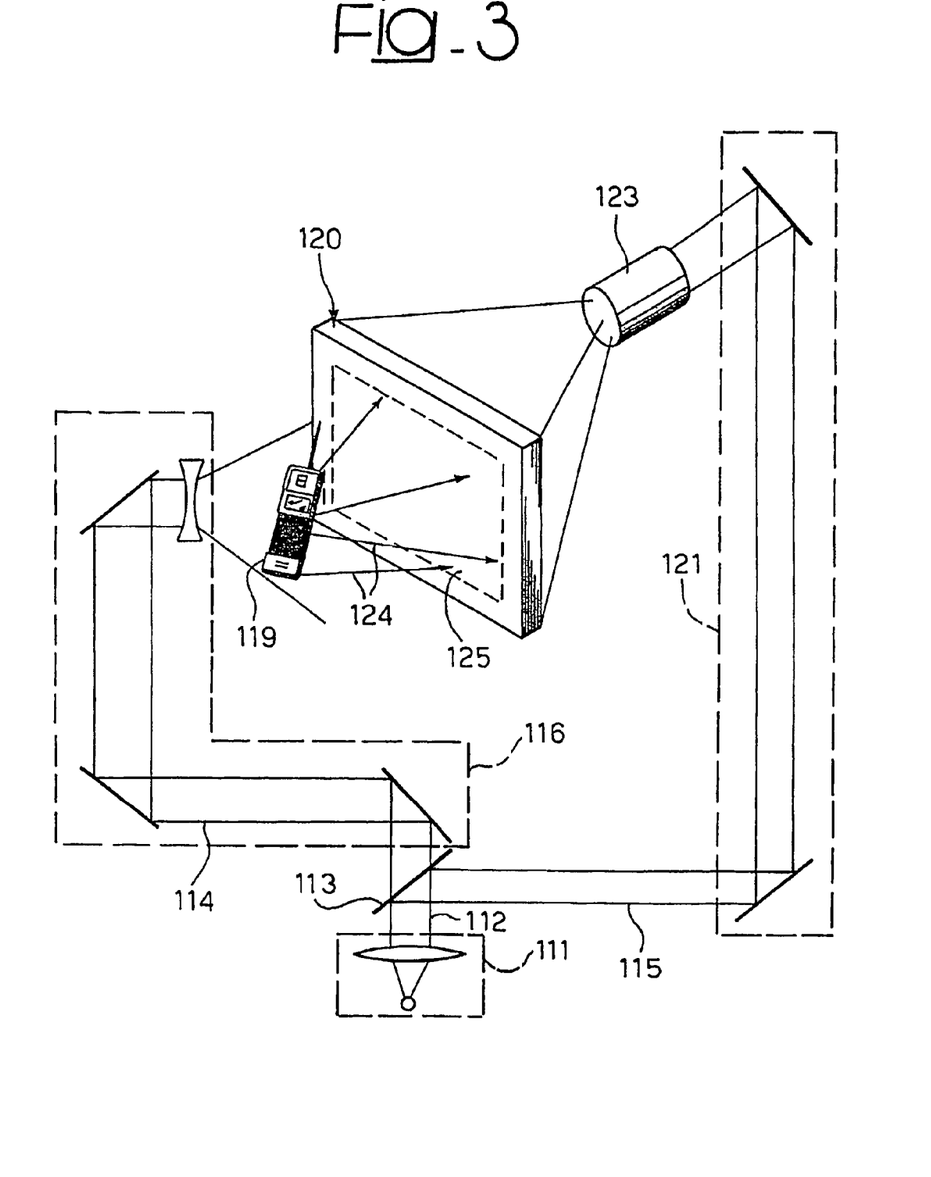
FIG. 3 represents a hologram recording step suitable for being used in the method according to the invention.

Now an embodiment of the proposed method for inputting commands in holographic input device, suitable for representing the keyboard of a mobile handset phone will be detailed with reference to FIGS. 3, 4 and 5.

The proposed method includes performing a step of recording of a hologram 125 of a keyboard 119 of a mobile handset. The arrangement for performing such a step of recording is shown in FIG. 3, and comprises a laser source 111, generating a laser beam 112 that impinges on a beam splitter mirror 113. Such a beam splitter mirror 113 generates a beam 114 and a reference beam 115, that are coherent.

The beam 114 is conveyed by a mirror system 116 including deflecting mirrors and a lens on the keyboard 119. Such a keyboard 119 reflects the beam 114 originating a diffused beam 124, that impinges on a photographic plate 120.

A mirror system 121 reflects the reference beam 115 through an optical system 123, for example a beam steerer of known type, on the photographic plate 120.

In this way the hologram 125 of the keyboard 119 is recorded on the plate 120.

Figure 4:
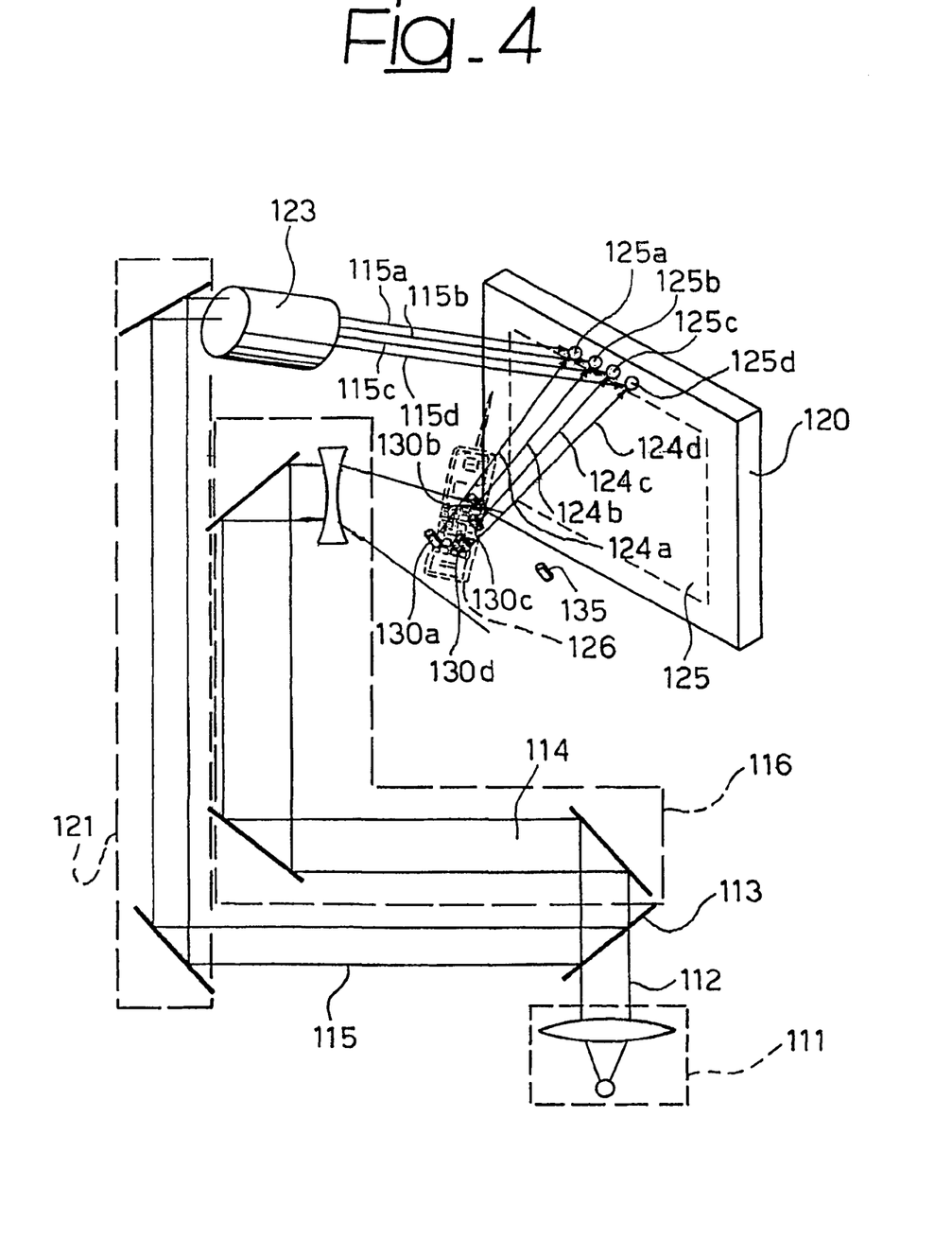
FIG. 4 represents a second hologram recording step suitable for being used in the method according to the invention.

Further, as shown in FIG. 4, the proposed method provides for a step of recording on the photographic plate 120 a plurality of holograms 125a, 125b, 125c, 125d, corresponding to different actuator positions 130a, 130b, 130c, 130d. The model actuator, indicated with reference 135 in FIG. 4, can be a finger or an indicator such as a plastic cylinder or an equivalent object.

Such actuator positions 130a, 130b, 130c, 130d are positions in space corresponding to the keys of the keyboard 119, and then illuminated by the beam 114, thus recording holograms in different areas on the plate 120. In order to record such holograms 125a, 125b, 125c, 125d of the actuator positions 130a, 130b, 130c, 130d, different reference beams, indicated with 115a, 115b, 115c, 115d in FIG. 4, are used. Said different reference beams 115a, 115b, 115c, 115d are directed sequentially in time by means of the optical system 123 to the different areas on the plate 120 where the beam 114 has been diffused by the actuator in each different actuator position 130a, 130b, 130c, 130d.

Such different reference beams 115a, 115b, 115c, 115d, have a size that covers a limited area on the plate 120 carrying the holograms, such a limited area being fairly smaller than the area covered by the hologram 125 of the keyboard.

Thus, the finger positions correspond to a spatial position on the plate 120, on which the position of the different keys are perceived by a user observing through the plate 120. The size of such different reference beams 115a, 115b, 115c, 115d also correspond substantially to the size of the keys of the keyboard.

During the recording of the hologram of the actuator 135 in the actuator positions 130a, 130b, 130c, 130d, a single reference beam among the different reference beams 115a, 115b, 115c, 115d is projected at a time for each among the actuators positions 130a, 130b, 130c, 130d, or key of the keyboard 119. In FIG. 4 only four actuator positions have been shown for the sake of simplicity, while it is clear that a hologram of an actuator can be recorded for each key.

Figure 5:
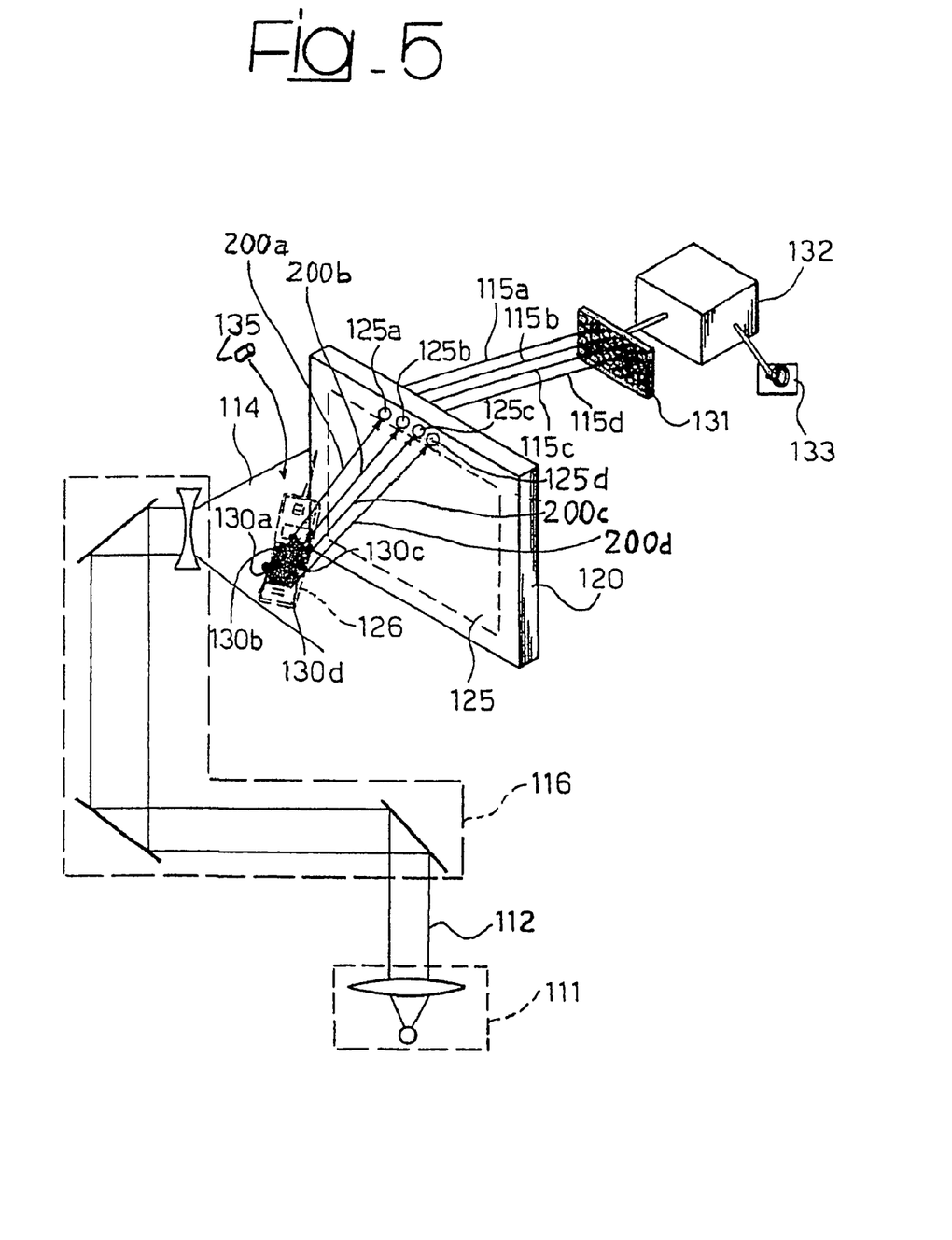
FIG. 5 represents an arrangement implementing the method according to the invention.

Once the hologram 125 of the keyboard 119 and the holograms 125a, 125b, 125c, 125d corresponding to actuator positions 130a, 130b, 130c, 130d are recorded on the plate 120, the input device is ready for being operated by a user, as shown in FIG. 5.

Interaction by a user with the keyboard 119 is based on a reading step of the finger position of the user by the arrangement shown in FIG. 5. Such an arrangement requires also the part of the optical arrangement shown in FIG. 3 that is devoted to reference beam generation, i.e. the mirror system 121 for reproducing a virtual image 126 of the keyboard 119. Such a mirror system 121 is not shown in FIG. 5 for sake of simplicity.

Thus, first, the virtual image 126 of the keyboard 119 is projected by conventionally illuminating the plate 120 with the reference beam 115, so that the user can see such a virtual image 126 through the plate 120.

At the same time, the area where the virtual image is to be seen is further illuminated by a beam 114, generated by laser source 111 and conveyed by mirror system 116.

If the user interposes a finger in the spatial position in which a key of the virtual image 126 of the keyboard is perceived by the observer, this corresponds to selectively placing an actuator 135 in the positions 130a, 130b, 130c or 130d in the path of the beam 114. Light scattered by the finger (actuator) is comprised of the object beams 200a, 200b, 200c, 200d, respectively, depending on the position of the actuator.

Thus, each object beam is able to selectively generate the corresponding reference beam 115a, 115b, 115c, 115d through the interaction with the plate 120.

The reference beam among beams 115a, 115b, 115c, 115d, that is generated through the plate 120 will impinge on a CCD array 131 or, in general, on a photodetector arrangement, in a position that is specific of that reference beam. Thus, when a finger is interposed on the virtual image 126, the CCD array 131 is able to detect which reference beam among plurality of reference beams 115a, 115b, 115c, 115d has been generated and to send such an information to a suitable microprocessor 132, that provides for operating the real actuation, i.e. is suitably programmed for transmitting a command string corresponding to the key of keyboard 119 that has been virtually depressed. The microprocessor 132 can also drive a suitable speaker 133, in order to generate a 'click' sound, in order to supply a feedback to the user about the actuated selection, and, in particular about the interaction with the image 126 of the keyboard 119. Such a feedback can be also a visual feedback.

It has to be already noted that along with the reference beams also the corresponding conjugate beams are generated during the interaction with the virtual image 126. Such conjugate beams can be time correlated with the corresponding reference beams in order to increase the signal to noise ratio or can be used as a alternate or backup reading system.

An apparatus and method for holographic control have thus been described herein that permit for a holographic representation of an input device and a direct interaction with such a holographic representation. To that end the instant description discloses an arrangement for recording and reading holograms. Operation of that arrangement is based on recording separately on a holographic support a hologram of the input device and one or more holograms of an actuator suitable for operating the input device and letting the user interact with the holographic image of the input device, in order to have generation of a suitable reference beam if a real actuator, i.e. a user's finger, is placed in a position on the holographic image of the input device corresponding to a position in which a hologram of an actuator was previously recorded.

This arrangement differs from methods of image recognition using Fourier holography, since it does not require optical elements to transform and antitransform the images.

Moreover, the proposed arrangement does not require volumetric position sensors or devices. In fact the present invention requires only a simple sensor, as for example a CCD or a bank of few photo-diodes.

Consequently, without prejudice to the underlying principles of the invention, the details and the embodiments may vary, also appreciably, with reference to what has been described by way of example only, without departing from the scope of the invention as defined by the annexed claims.

For instance, the prerecording step can be operated in different ways, for what concerns placement of actuators.

As an example, a plurality of actuators can be provided and all such actuators can be placed at the same time on the corresponding keys. Multiple reference beams can be thus addressed on the corresponding plate areas, through a suitable reference beam splitting device.

As an alternative embodiment, volume holography can be used. In this case, when recording the different holograms of the input device and of the actuators in different positions, such holograms are recorded in the same area of the holographic support, varying however the incidence angle of the different reference beams associated to each of such holograms. Each reference beam with its own incidence angle will be associated to a specific hologram and a specific virtual image.

Finally, it must be noted that, although in the above description reference has been made to a 'holographic support', represented as a single plate, such a holographic support can comprise a plurality of holographic supports, e.g. a holographic support where the input hologram is recorded on a first plate and the actuator holograms are recorded on a second plate. Such first plate and second plate can be recorded separately and assembled in the final input system. It is also possible to have different plates with actuators hologram corresponding to different types of actuator (e.g. big fingers and little fingers) that are assembled with the plate carrying the keyboard hologram at user's desire.

The invention claimed is:

1. A method for inputting commands, comprising the steps of:
   generating a virtual image of an input device by illuminating a hologram of said input device, said hologram being prerecorded on a holographic support;
   optically detecting an intended operation of said input device based on an actual position of an actuator with respect to said virtual image of said input device, based on at least one predetermined position of said actuator with respect to said virtual image of said input device, wherein each predetermined position corresponds to a distinct operation of said input device; and
   issuing at least one command signal for executing the intended operation of said input device as optically detected, said optical detection step comprising:
      providing at least one actuation hologram corresponding to said actuator being placed at the at least one predetermined position with respect to said virtual image of said input device, wherein the at least one actuation hologram is prerecorded, separately from the hologram of said input device, with an object beam illuminating on said actuator and at least one respective reference beam;
      illuminating said actuator placed at the actual position of said actuator with the object beam;
      detecting an actuation detection beam generated by an interaction between the object beam and the actuator;
      identifying one reference beam, among the at least one respective reference beam, that conforms to the actuation detection beam; and
      determining the predetermined position of said actuator corresponding to the identified reference beam and designating the operation corresponding to the identified predetermined position of said actuator as the intended operation.

2. The method of claim 1, comprising a step of prerecording on said holographic support said at least one actuation hologram.

3. The method of claim 2, wherein said prerecording step comprises placing said actuator at said at least one predetermined position with respect to said virtual image and recording a corresponding actuation hologram through the respective reference beam.

4. The method of claim 1, wherein said actuation hologram is located in a different area of said holographic support with respect to an area in which the hologram of the input device is recorded.

5. The method of claim 1, wherein the area used by said actuation hologram is substantially smaller in size with respect to an area in which the hologram of the input device is recorded.

6. The method of claim 1, wherein identifying the position of said actuator comprises detecting that said actuation detection beam corresponds to a conjugate beam of the respective reference beam used for recording said respective actuation hologram.

7. The method of claim 6, wherein the conjugate beam of said respective reference beam used for recording said respective actuation hologram is also detected.

8. The method of claim 1, wherein said input device is a keyboard.

9. The method of claim 1, wherein said actuation hologram has a size comparable with the size of a key of the input device.

10. The method of claim 1, further comprising the step of supplying an audio or visual feedback of said step of detecting said respective actuation detection beam.

11. The method of claim 1, comprising the step of recording said hologram of the input device and said actuation hologram on separate holographic supports and assembling said supports so as to form said holographic support.

12. The method of claim 1, wherein said at least one actuation hologram is recorded in a same area of the holographic support by varying an incidence angle of the respective reference beam.

13. A system for inputting commands, comprising:
an optical system for generating a virtual image of an input device by illuminating a hologram of said input device, said hologram being prerecorded;
an optical detection module for optical detection of an intended operation of said input device based on an actual position of an actuator with respect to said virtual image of said input device, based on at least one predetermined position of said actuator with respect to said virtual image of said input device, wherein each predetermined position corresponds to a distinct operation of said input device; and
an issuing module for issuing at least one command signal for executing the intended operation of said input device as optically detected, said optical detection module comprising:
at least one actuation hologram corresponding to said actuator being placed at the at least one predetermined position with respect to said virtual image of said input device, wherein the at least one actuation hologram is prerecorded, separately from the hologram of said input device, with an object beam illuminating on said actuator and at least one respective reference beam; and
an optical system for illuminating said actuator placed at the unknown position with the object beam, wherein the optical detection module is configured to:
detect an actuation detection beam generated by an interaction between the object beam and the actuator,
identify one reference beam, among the at least one respective reference beam, that conforms to the actuation detection beam; and
determine the predetermined position of said actuator corresponding to the identified reference beam and designating the operation corresponding to the identified predetermined position of said actuator as the intended operation.

14. The system of claim 13, wherein said at least one prerecorded actuation hologram is prerecorded on said holographic support.

15. The system of claim 13, wherein the at least one prerecorded actuation hologram includes a plurality of prerecorded actuation holograms and said prerecorded actuation holograms are recorded separately with respect to each other through corresponding reference beams.

16. The system of claim 14, wherein said holographic support carries different areas for recording said at least one prerecorded actuation hologram with respect to an area for recording the hologram of the input device.

17. The system of claim 14, wherein the area used by said at least one actuation hologram is substantially smaller in size with respect to an area in which the hologram of the input device is recorded.

18. The system of claim 13, wherein said input device is a keyboard.

19. The system of claim 14, wherein said at least one actuator hologram has a size similar to a size of a key of the input device.

20. The system of claim 13, wherein said optical detection module is an array of charge coupled devices.

21. The system of claim 13, wherein the optical detection module comprises a module for audio or visual feedback of the detection of said respective actuation detection beam.

22. The system of claim 13, wherein said holographic support comprises a plurality of assembled holographic supports.

23. The system of claim 13, wherein said holographic support carries said at least one actuation hologram in a same area.

24. A holographic support comprising the system of claim 13.

25. A method for producing a holographic support of claim 24, comprising the steps of:
recording the hologram of said input device on said holographic support by means of a first object beam and a first reference beam; and
recording, on said holographic support by means of a second object beam and at least one respective second reference beam, at least one actuator hologram of the actuator being placed at the at least one predetermined position with respect to the virtual image of said hologram of said input device.

* * * * *